US010980622B2

(12) United States Patent
Rathkolb

(10) Patent No.: US 10,980,622 B2
(45) Date of Patent: Apr. 20, 2021

(54) TOOTH CLEANING DEVICE

(71) Applicant: Denticlean e. U., Vienna (AT)

(72) Inventor: Franz Augustin Rathkolb, Vienna (AT)

(73) Assignee: Denticlean e. U., Vienna (AT)

( * ) Notice: Subject to any disclaimer, the term of this patent is extended or adjusted under 35 U.S.C. 154(b) by 32 days.

(21) Appl. No.: 15/790,239

(22) Filed: Oct. 23, 2017

(65) Prior Publication Data
US 2019/0117352 A1  Apr. 25, 2019

(51) Int. Cl.
*A61C 15/00* (2006.01)
*A61C 9/00* (2006.01)
*A46B 9/04* (2006.01)

(52) U.S. Cl.
CPC .............. *A61C 15/00* (2013.01); *A46B 9/045* (2013.01); *A61C 9/0006* (2013.01)

(58) Field of Classification Search
CPC ........ A61C 15/00; A61C 9/0006; A46B 9/045
USPC .......................................................... 433/37
See application file for complete search history.

(56) References Cited

U.S. PATENT DOCUMENTS

| | | | |
|---|---|---|---|
| 4,237,574 A | 12/1980 | Kelly et al. | |
| 4,445,854 A * | 5/1984 | Bekey | A61C 9/00 433/37 |
| 4,543,062 A * | 9/1985 | Lee | A61C 9/0006 433/214 |
| 4,693,683 A * | 9/1987 | Lee | A61C 9/00 433/37 |
| 6,896,519 B2 * | 5/2005 | Chen | A61C 17/0211 433/215 |
| 8,449,294 B2 * | 5/2013 | Gramann | A61C 9/0006 433/37 |

(Continued)

FOREIGN PATENT DOCUMENTS

| | | |
|---|---|---|
| DE | 4002479 A1 | 8/1991 |
| DE | 10029174 A1 | 1/2002 |

(Continued)

OTHER PUBLICATIONS

Espace Machine Translation DE4002479A1, 9 pages.
(Continued)

*Primary Examiner* — Matthew M Nelson
(74) *Attorney, Agent, or Firm* — Stinson LLP

(57) ABSTRACT

A tooth cleaning device for the specific cleaning of crevices between teeth and gingival pockets having a curved carrier body in the shape of a jaw and a resilient, curable dental impression material, which is applied on both sides of the carrier body. The impression material is applied at a low height such that, during use, only the occlusal surfaces of teeth submerge into the dental impression material, while the crevices between teeth are largely free from the dental impression material. The carrier body has at least one, preferably a plurality of centering projections, which ensure that the tooth cleaning device is inserted in a centric position of the jaw. The device forms a barrier between the actual oral cavity (cavum oris proprium) and the oral vestibule, that is, the space between the lips/cheeks and row of teeth (vestibulum oris). In view of this barrier, the crevices between teeth present the only passage through which a cleaning fluid can be pressed by moving the tongue and/or cheek muscle.

20 Claims, 2 Drawing Sheets

(56) References Cited

U.S. PATENT DOCUMENTS

| | | | |
|---|---|---|---|
| 8,783,259 B2* | 7/2014 | Spencer | A61F 5/566 |
| | | | 128/848 |
| 9,867,753 B2* | 1/2018 | Garay-Arauz | A61H 1/02 |
| D813,397 S * | 3/2018 | Kashiwabara | D24/181 |
| 10,751,153 B2* | 8/2020 | Charkhandeh | A61B 5/4818 |
| 2003/0075731 A1* | 4/2003 | Chen | A61C 17/0211 |
| | | | 257/200 |
| 2006/0201520 A1* | 9/2006 | Christensen | A61C 9/0006 |
| | | | 128/848 |
| 2008/0032256 A1* | 2/2008 | Thornton | A61C 11/06 |
| | | | 433/57 |
| 2009/0272387 A1* | 11/2009 | Spencer | A61F 5/566 |
| | | | 128/848 |
| 2010/0145781 A1 | 6/2010 | Nishikawa et al. | |
| 2010/0151408 A1* | 6/2010 | Gramann | A61C 9/0006 |
| | | | 433/37 |
| 2015/0173856 A1* | 6/2015 | Lowe | A61C 7/00 |
| | | | 433/24 |
| 2016/0361140 A1* | 12/2016 | Lowe | A61C 7/002 |

FOREIGN PATENT DOCUMENTS

| | | |
|---|---|---|
| DE | 10040565 A1 | 3/2002 |
| DE | 10153245 A1 | 5/2003 |
| DE | 202009008362 U1 | 10/2009 |

OTHER PUBLICATIONS

Espace Machine Translation DE10029174A1, 20 pages.
Espace Machine Translation DE10040565A1, 15 pages.
Espace Machine Translation DE10153245A1, 39 pages.
Espace Machine Translation DE202009008362U1, 13 pages.

* cited by examiner

TOOTH CLEANING DEVICE

FIELD OF THE INVENTION

The present invention relates to a tooth cleaning device having a curved carrier body and which employs a resilient plastically deformable dental impression material applied to the upper side and the bottom side of the carrier body.

BACKGROUND

DE 10040565 A1 describes a tooth cleaning device having a resilient molded body, which contains a rinsing fluid in its interior and has at least one hole. If a user bites onto the molded body, it is compressed and the rinsing fluid also reaches the crevices between teeth and the gingival pockets. When disengaging, this molded body expands again and, in this instance, suctions back the rinsing fluid.

DE 10029174 A1 describes a tooth cleaning device having a pressure-suction device for a cleaning fluid, including an end piece for attachment to the teeth and including a conduit which is connected to the end piece and the pressure-suction device. In this way, in particular crevices between teeth are to be irrigated in the manner of an oral irrigator.

DE 10153245 A1 describes an oral irrigator including an oral irrigator tray and an oral irrigator cast for insertion into the oral irrigator tray, the oral irrigator tray being a curved trough in the shape of a jaw, and the oral irrigator cast being the imprint of a series of teeth having perforations, the oral irrigator, when in the state applied to the jaw of a user, forming a closed chamber, which has channels and connectors for the inflowing and outflowing of liquids, and to which a vacuum can be applied.

DE 2009008362U1 describes a tooth cleaning device having a dental impression tray for the upper and lower jaw and a flexible, curable dental impression material, the dental impression tray being connected to an actuating device, which induces mechanical vibrations in the oral irrigator tray. In this instance, the dental impression material is to cover all teeth up to the gums to the greatest possible extent.

U.S. Pat. No. 6,896,519 B2 shows a tooth cleaning device having a carrier body which, seen from a top view, is shaped in the form of a human jaw and has an upper side and a bottom side which are coated by a resilient, plastically deformable dental impression material for taking an impression of occlusal surfaces of the teeth. The carrier body has a bulge in its central region, having an aperture, through which a cleaning fluid may be supplied from an external reservoir. If the user bites onto this thickening, the fluid stream through this aperture can be stopped. The dental impression material is applied in such low height to the upper side and the bottom side of the carrier body, that when using the device, only the occlusal surfaces of teeth submerge into the dental impression material, while the crevices between teeth largely remain free of the dental impression material.

U.S. Pat. No. 4,237,574 A shows a tooth cleaning device including a U-shaped rail, which has such dimensions that it covers a row of teeth of the upper or lower jaw at a distance, having a plurality of jets which spray cleaning fluid onto the sides and onto the occlusal surfaces of the teeth. A plurality of vertical projections extend from one side of the device, which serve as a stop for the occlusal surfaces of teeth.

Known aids, for example, tooth brushes, dental floss or inter-dental brushes, may not or only insufficiently remove or clean bacteria and food particles from crevices between teeth and, in particular, from gingival pockets. In particular, so-called plaque, which is responsible for cavities and periodontosis, forms in crevices between teeth and gingival pockets. Also, the devices described above enable a cleaning of the crevices between teeth either only to a limited extent or the devices are complex and partially require the supply of electric power for operation.

SUMMARY OF THE INVENTION

The object of the present invention is to create a simple and cost-effective tooth cleaning device, by which in particular crevices between teeth, spaces between the tooth/neck of the tooth and the gums and gingival pockets can be cleaned.

Briefly, therefore, the invention is directed to a tooth cleaning device, comprising a carrier body which is curved in the shape of a human jaw and which has an upper side and a bottom side; at least two centering projections on the upper side of the carrier body in a central region of the carrier body, wherein the centering projections extend from the upper side of the carrier body and run parallel to each other; and at least one centering projection on the bottom side of the carrier body positioned offset with respect to the centering projections on the upper side of the carrier body.

In another aspect, the invention is directed to a tooth cleaning device kit comprising a carrier body which is curved in the shape of a human jaw and which has an upper side and a bottom side; and a resilient plastically deformable dental impression material adapted for application to the upper side and the bottom side of the carrier body and adapted for taking an impression of the occlusal surfaces of the tooth; wherein the carrier body comprises at least two centering projections on the upper side of the carrier body in a central region of the carrier body, wherein the centering projections extend from the upper side of the carrier body and run parallel to each other; and the carrier body comprises at least one centering projection on the bottom side of the carrier body positioned offset with respect to the centering projections on the upper side of the carrier body.

Other objects and features of the invention will be in part apparent and in part pointed out hereinafter.

BRIEF DESCRIPTION OF THE FIGURES

FIGS. 2, 3 and 4 showing the dental impression material being additionally applied, and the teeth of the user are also in part illustrated.

DETAILED DESCRIPTION OF PREFERRED EMBODIMENTS

Figure 1:
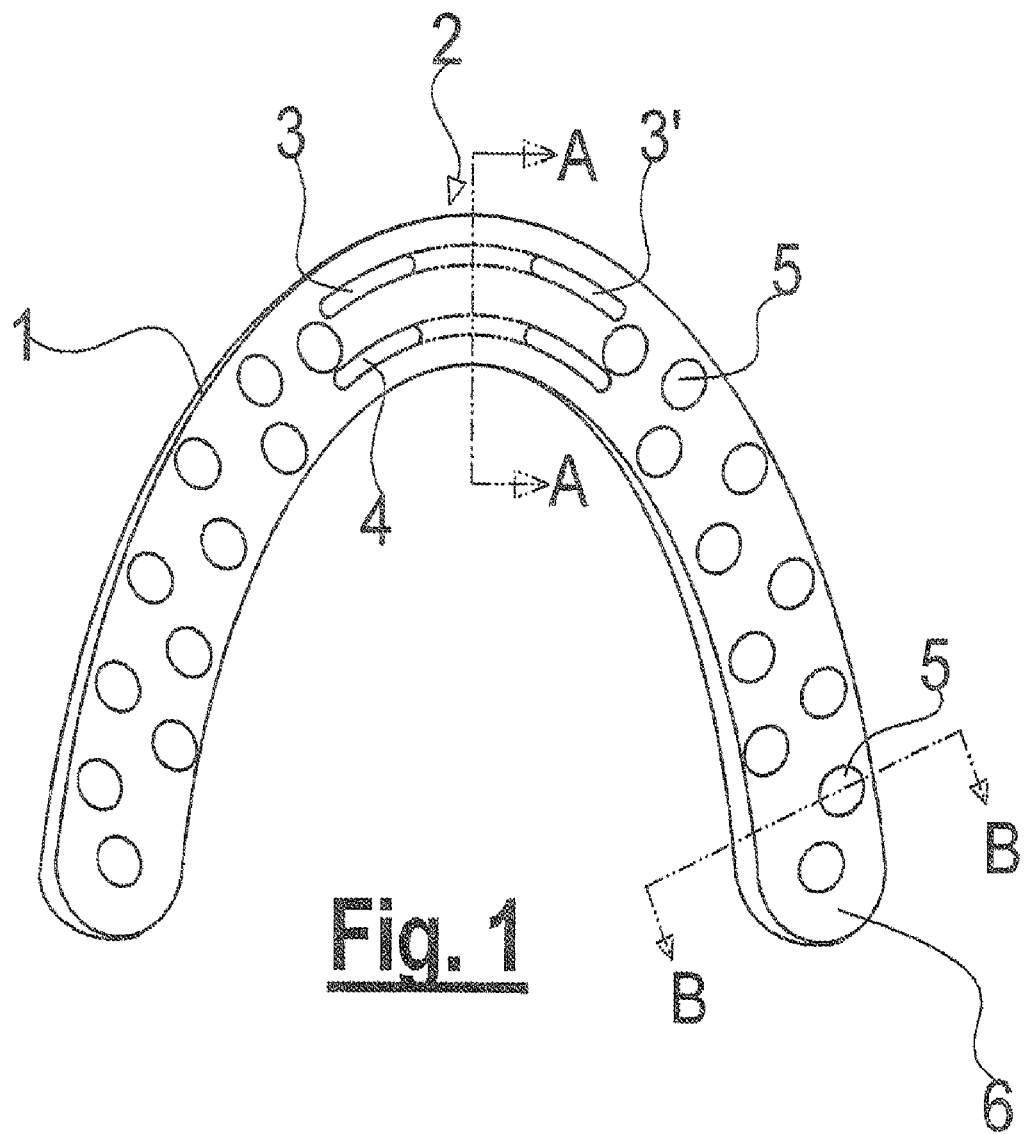
FIG. 1 shows a top view of the upper side of a carrier body according to the present invention.

The principle idea of the present invention is that the tooth cleaning device seals the occlusal surfaces of upper and lower jaw against each other so that the rows of teeth of upper and lower jaw substantially form a tight barrier, which seals the actual oral cavity (cavum oris proprium) lying within the rows of teeth vis-à-vis the oral vestibule (vestibulum oris), that is, the space between lips/cheeks and rows of teeth. By vigorously moving the tongue upward and downward and/or moving the cheek muscle, a suitable fluid having admixed abrasive cleaning particles/pigments may be pressed through the crevices between the teeth and back from the actual oral cavity in the direction of the oral vestibule, so that food particles and bacterial plaque, in particular in the crevices of teeth and gingival pockets, can be mechanically detached as solid material using water mixed with abrasive cleaning particles moves under high pressure. The sealing is implemented by the user assuming a centric bite.

This centric bite is advantageous to ensure that the mandibular joint is moved into a position physiologically perpendicular for the mandibular joint. If the centric position of the jaw is not ensured by the carrier body, long-term damage to the mandibular joint may result.

Accordingly, the device includes a carrier body curved in the shape of a jaw, which has at least one centering projection in its central region extending to one side, and a resilient impression material applied to the carrier body having imprints of a row of teeth of the upper and lower jaw, the thickness of the impression material being selected so small that, in a state when mounted to the jaw of a user, substantially only the occlusal surfaces and the tips of the teeth are in contact with the impression material while the side surfaces of the teeth remain unobstructed.

Alternatively, the carrier body on the upper and bottom side may also be glued/coated by a soft rubber or foam, which preferably is plastically deformable. In this case, the dentist would not have to individually fit the device for sealing the occlusal surfaces. In this case, the user would carry out the fitting when using the device for the first time. In this case, the impression of the occlusal surfaces in the rubber or foam is carried out when the user first inserts the carrier body into the oral cavity and first bites down on the carrier body.

This option represents a substantial cost advantage for the user. This product could be recycled after the sealing foam has been worn away. By prefabricating the ready-to-use sealing rail, the device could be industrially manufactured and then be purchased in the retail trade.

The centering projection ensures that the desired centric bite is maintained. Except for the region of the centering projections, the carrier body is substantially flat on both sides so that only the occlusal surfaces of the teeth minimally submerge into the impression material, the carrier body however not forming a trough in the cross section.

Preferably, the carrier body has a plurality of perforations so that the impression materials of the upper and bottom sides are connected to each other through these perforations and, thus, also are held positively at the carrier body.

In the direction pointing to the upper jaw, there are one or two parallel centering projections. In this case, the incisors of the upper jaw ensure the positioning of the device at the upper jaw.

According to the present invention, one or two parallel centering projections are also on the side of the carrier body pointing to the lower jaw. As a result, the relative positioning between upper and lower jaw is then also ensured, the centering projections being positioned in such a manner that a so-called centric bite is achieved, in which the angular pivot point is the natural position of the mandibular joint.

Preferably, the carrier body is made of plastic or other materials, thermoplastic injection molding-capable plastic materials being preferable, for example, polyvinyl chloride (PVC), polyethylene (PE), polyurethane (PU), polypropylene (PP) or similar biocompatible plastics.

As a dental impression material, which seals the occlusal surfaces relative to each other, a fast-curing plastic approved for application in the oral cavity, for example vinyl polysiloxane, silicone, alginates or polyurethane, is preferably suggested. Alternatively, the carrier body on the upper and bottom side may also be glued/coated by a soft rubber or foam, which preferably is plastically deformable, and in this manner also takes a lasting impression of the occlusal surfaces of the teeth.

In order to prepare the device for use, the dentist, dental assistant or user applies the dental impression material in low quantity to the carrier body, and particularly on its two sides. Subsequently, the carrier body coated by the dental impression material is inserted into the mouth, the correct position for the centric bite being achieved by the centering projection(s), and an impression of upper and lower jaw is taken. After the dental impression material has cured, the device is ready for use. Thus, only one impression of the occlusal surfaces of upper and lower jaw is taken.

In the case of the carrier plate being coated by rubber or foam, the user carries out the impression of the occlusal surfaces, that is, carries out the customization. In this case, the centering projections at the upper and/or bottom side ensure the centric bite.

In order to press the liquid abrasion agent under high pressure and at high speed without difficulty through the crevices between teeth, the crevices between teeth are to be largely free from the impression material. Preferably, the cleaning process is to be carried out after the usual mechanical brushing of the teeth using a tooth brush has occurred.

To clean teeth using the device according to the present invention, an abrasive agent in paste-like or liquid form is used as cleaning fluid, which, when used, is to detach bacterial plaque and the food particles remaining in the crevices between teeth and the gingival pockets. In so doing, mechanically acting particles are used which have grain sizes between 1 µm to 800 µm, and preferably 180 µm; for example, marble dusts (calcium carbonate/lime) or other microparticles made from oxide, various powdered minerals, plastic or the like in the specified grain size. The particles are to have a lesser hardness than tooth enamel or tartar, so that no damage results.

Optionally, also chemical substances, for example surfactants, and antibacterial active substances, which are approved for use in the oral cavity and which support the detachment of bacteria damaging the enamel or also of food particles, can additionally be used. Substances which prevent the repopulation of the tooth by bacteria causing cavities or which strengthen the enamel, for example fluoride, may also be added to the rinsing agent.

When using the device, the user inserts the device prepared in the manner described above into the mouth, "bites" on the device, absorbs a portion of the cleaning fluid into the mouth and, by an upward and downward motion of the tongue and/or of the cheek muscle, presses the fluid through the crevices of teeth and the gingival pockets.

In the following, the present invention is described in greater detail on the basis of exemplary embodiments within the context of the drawing.

FIG. 1 shows a carrier body 1 in a top view onto its upper side 6, which points to the upper jaw when in use. Carrier body 1 is curved approximately in a U-shape and, for this reason, is adapted to the shape of the jaw of a user. In its central region 2, carrier body 1 here has two centering projections 3 and 4, which run parallel at a distance to each other. The mentioned distance is selected in such a manner that the incisors of the user are able to engage just between the two centering projections and, in this way, center carrier body 1, so that the centric bite defined by the mandibular joint is assumed.

Further, the carrier body has a plurality of perforations 5. These perforations 5 serve the purpose to connect a dental impression material (10 in FIGS. 2 through 5), not shown in FIG. 1, at upper side 6 and bottom side 7 of carrier body 1 through perforations 5 and, in this way, to also ensure a positive bond of the dental impression material at carrier body 1, which is clearly illustrated in FIG. 5.

Except for the centering projections at upper side 6 and bottom sides 7, carrier body 1 is configured in a flat manner and, for this reason and in contrast to conventional dental impression trays, does not have a trough. As a result, a largely unimpeded flow of cleaning fluid through the crevices between teeth is ensured.

Centering projections 3 and 4 may be continuous projections. They also may each be subdivided, as shown by sections 3 and 3', so that a section shown as a dash-dot line in FIG. 1 does not have centering projections.

Figure 2:
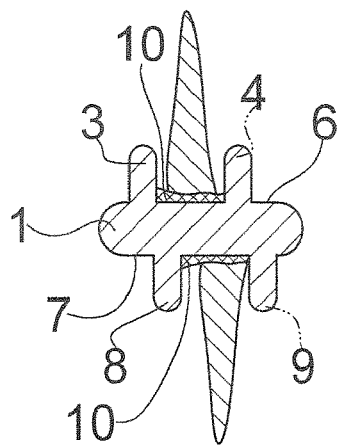
FIG. 2 shows a section along line A-A of FIG. 1 according to a first exemplary embodiment of the present invention.

As shown in FIG. 2, the centering projections may be on upper side 6 and bottom side 7 of carrier body 1, centering projections 8 and 9 at upper side 6 being laterally offset in the direction of the center so to ensure the "overbite" of the upper jaw in relation to the lower jaw, which corresponds to the natural centric bite. The centering projections may be aligned perpendicular to the upper and bottom side of the carrier body, or they may also be aligned in an angle other than 90°, then preferably forming a V-shaped depression.

Figure 3:
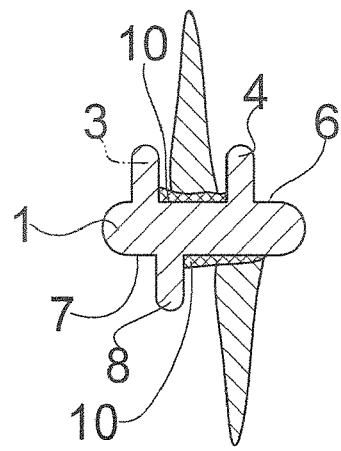
FIG. 3 shows a section similar to FIG. 2 according to a second exemplary embodiment of the present invention.
Figure 4:
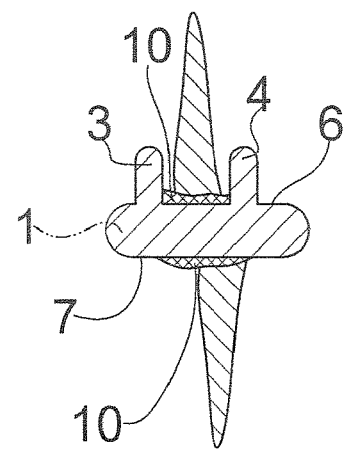
FIG. 4 shows a section similar to FIG. 2 according to a third exemplary embodiment of the present invention.
Figure 5:
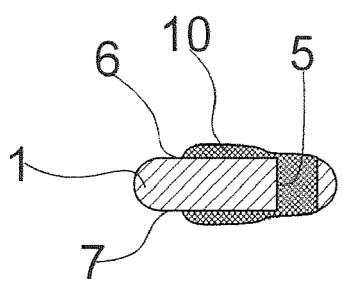
FIG. 5 shows a section along line B-B from FIG. 1.

In the variation of the present invention according to FIG. 3, only one centering projection 8 is on the bottom side 7, while, in the exemplary embodiment of FIG. 4, centering projections 3 and 4 are only provided at upper side 6, and at bottom side 7 of carrier body 1, no centering projection is provided. While not mandatory, centering projections may preferably be on the upper and bottom sides. Preferred, however, is the variation of FIG. 2.

In order to prepare the device ready-for-use according to one variation of the present invention, the user has to take an impression of the occlusal surfaces. For this purpose, a small quantity of dental impression material 10 is applied to upper side 6 and bottom side 7 of carrier body 1, then carrier body 1 is inserted into the mouth and takes a dental impression of the upper and lower jaw. Suitable dental impression materials are described at the outset. After fast-curing dental impression material 10 has cured at upper side 6 and bottom side 7 and in perforations 5, the device is ready for use. And, as clearly can be seen from FIG. 5, dental impression material 10 of the upper and bottom side is connected through perforations 5, so that dental impression material 10 is also positively held at carrier body 1.

It also can be seen from FIGS. 2 through 5 that the dental impression material is applied only in very small quantity to carrier body 1. This way, the material manifests a thickness so small that substantially only the occlusal surfaces of the teeth abut the dental impression material, while the dental impression material does not cover, or only to an extremely small extent covers, the crevices between teeth.

When using the device according to the present invention, the following steps are carried out: inserting the device described above into the oral cavity in such a manner that the rows of teeth of upper and lower jaw engage into the dental impression material at the dental imprint taken previously; taking an amount of cleaning fluid into the oral cavity; and pressing the cleaning fluid numerous times through the crevices between teeth by moving the tongue and/or the cheek muscle.

In this instance, the sequence here indicated is not mandatory, that is, the cleaning fluid may be taken in after but also before inserting the device.

A kit made available to the user thus includes: a carrier body 1 according to the description above; a packaged quantity of dental impression material; and a cleaning fluid.

If necessary, the kit may also additionally include instructions for use.

In summary, the present invention creates a tooth cleaning device for the specific cleaning of crevices between teeth, the space between tooth and the gums abutting at the tooth, and of the gingival pockets, being made up of a carrier body (1) in the shape of a jaw, and a resilient, plastically deformable and preferably curable dental impression material (10), which is applied on both sides (6, 7) of the carrier body (1) in such small quantity that, during use, only the occlusal surfaces of teeth submerge into the dental impression material (10), while the crevices between teeth are largely free from the dental impression material (10). The carrier body has a plurality of centering projections (3, 4, 8, 9), which ensure that the tooth cleaning device is inserted in a centric position of the jaw. The device forms a barrier between the actual oral cavity (cavum oris proprium) and the oral vestibule, that is, the space between the lips/cheeks and row of teeth (vestibulum oris). In view of this barrier, the crevices between teeth present the only passage through which a cleaning fluid can be pressed by moving the tongue and/or cheek muscle.

It is evident that the present invention creates a tooth cleaning device for cleaning crevices between teeth and gingival pockets, which is constructed in a particularly simple manner, does not require additional aids, such as pumps, under and over pressure generators, etc., and still enables an immaculate cleaning of crevices between teeth and gingival pockets. The device can be produced in a cost-effective manner, is easy to handle and is effective in its application.

The present invention generally provides a substantial improvement of oral hygiene and/or personal hygiene and, for his reason, substantially contributes to the physical health and social acceptance of the individual. In particular, this invention however also provides an aid for people suffering from periodontosis (gum loss). Patients suffering from periodontosis are not able to clean their teeth and gums in a practical manner when using presently available aids. Further inflammations and further gum loss result. Breath odor may result in social isolation. The mentioned invention also provides a substantial improvement for people suffering from breath odor. When used regularly, the device may support maintaining a healthy set of teeth into old age. In particular, the crevice between teeth, which is difficult and insufficiently cleaned, and the gingival pockets/gums (food particles remaining at the tooth cause the growth of caries bacteria; cavities, which form very early, in particular in the crevices between teeth, are, however, detected at a late stage and cannot or can only insufficiently be repaired) can be effectively cleaned by this device from bacterial plaque and food particles in an effective and time-saving manner. For this reason, the present invention represents a substantial support in maintaining the population's health.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above products and methods without departing from the scope of the invention, it is intended that all matter contained in the above description and shown in the accompanying drawings shall be interpreted as illustrative and not in a limiting sense.

What is claimed is:

1. Tooth cleaning device, comprising:
   a carrier body which is curved in the shape of a human jaw and which has an upper side and a bottom side, and an open center between two curved legs which meet to form an arch;
   at least two centering projections on the upper side of the carrier body in a central region of the carrier body at the top of the arch where the two curved legs meet, wherein the centering projections extend from the upper side of the carrier body and run parallel to each other; and
   at least one centering projection on the bottom side of the carrier body positioned offset with respect to the centering projections on the upper side of the carrier body;
   wherein the carrier body is flat on both sides on the curved legs other than in the region of the centering projections, and does not form a trough in cross section other than in the region of the centering projections at the top of the arch.

2. The tooth cleaning device as recited in claim 1, wherein the carrier body is manufactured from a thermoplastically injection molding-capable plastic.

3. The tooth cleaning device as recited in claim 2, wherein the carrier body has a plurality of perforations, which extend from the upper side to the bottom side.

4. The tooth cleaning device as recited in claim 1, wherein the carrier body has a plurality of perforations, which extend from the upper side to the bottom side.

5. The tooth cleaning device as recited in claim 1, wherein the carrier body is manufactured from, PVC, PE, PU, or PP.

6. The tooth cleaning device of claim 1 wherein the centering projections consist of two centering projections on the upper side of the carrier body and two centering projections on the bottom side of the carrier body, and these are the only centering projections on the device.

7. The tooth cleaning device of claim 1 wherein the centering projections consist of two centering projections on the upper side of the carrier body and one centering projections on the bottom side of the carrier body, and these are the only centering projections on the device.

8. A tooth cleaning device kit comprising:
   a carrier body which is curved in the shape of a human jaw and which has an upper side and a bottom side, and an open center between two curved legs which meet to form an arch; and
   a resilient plastically deformable dental impression material adapted for application to the upper side and the bottom side of the carrier body and adapted for taking an impression of the occlusal surfaces of the tooth;
   wherein the carrier body comprises at least two centering projections on the upper side of the carrier body at the top of the arch where the two curved legs meet, wherein the centering projections extend from the upper side of the carrier body and run parallel to each other; and
   the carrier body comprises at least one centering projection on the bottom side of the carrier body positioned offset with respect to the centering projections on the upper side of the carrier body;
   wherein the carrier body is flat on both sides on the curved legs other than in the region of the centering projections, and does not form a trough in cross section other than in the region of the centering projections at the top of the arch.

9. The tooth cleaning device kit as recited in claim 8, wherein the carrier body is manufactured from a thermoplastically injection molding-capable plastic.

10. The tooth cleaning device kit as recited in claim 9, wherein the carrier body has a plurality of perforations, which extend from the upper side to the bottom side.

11. The tooth cleaning device kit as recited in claim 8, wherein the carrier body has a plurality of perforations, which extend from the upper side to the bottom side.

12. The tooth cleaning device kit of claim 11 further comprising a resilient plastically deformable dental impression material adapted for application to the upper side and the bottom side of the carrier body and adapted for taking an impression of the occlusal surfaces of the tooth.

13. The tooth cleaning device kit as recited in claim 12, wherein the dental impression material is a resilient, curable material.

14. The tooth cleaning device kit as recited in claim 12, wherein the dental impression material is made from a resilient, plastically deformable rubber or foam.

15. The tooth cleaning device kit as recited in claim 12, wherein the carrier body is manufactured from a thermoplastically injection molding-capable plastic; and the curable dental impression material is made from a material which is fast-curing and approved for application in the oral cavity.

16. The tooth cleaning device kit as recited in claim 12, wherein the carrier body is manufactured from, PVC, PE, PU, or PP; and the curable dental impression material is made from vinyl polysiloxane, silicone, alginates or polyurethane.

17. The tooth cleaning device kit as recited in claim 8, wherein the carrier body is manufactured from, PVC, PE, PU, or PP; and the curable dental impression material is made from vinyl polysiloxane, silicone, alginates or polyurethane.

18. The tooth cleaning device kit as recited in claim 8, wherein the dental impression material is a resilient, curable material.

19. The tooth cleaning device kit as recited in claim 8, wherein the dental impression material is made from a resilient, plastically deformable rubber or foam.

20. The tooth cleaning device kit as recited in claim 8, wherein the carrier body is manufactured from a thermoplastically injection molding-capable plastic; and the curable dental impression material is made from a material which is fast-curing and approved for application in the oral cavity.

* * * * *